United States Patent [19]

Kuxdorf et al.

[11] 4,148,990

[45] Apr. 10, 1979

[54] CONTINUOUS REMOVAL OF MONOMERS FROM AN AQUEOUS DISPERSION OF A POLYMER

[75] Inventors: Bernhard Kuxdorf; Karl Kaiser, both of Brühl; Rudolf Wesselmann, Erftstadt, all of Fed. Rep. of Germany

[73] Assignee: Hoechst Aktiengesellschaft, Frankfurt am Main, Fed. Rep. of Germany

[21] Appl. No.: 831,156

[22] Filed: Sep. 7, 1977

[30] Foreign Application Priority Data

Sep. 9, 1976 [DE] Fed. Rep. of Germany ....... 2640546

[51] Int. Cl.$^2$ ............................. C08F 6/16; C08F 6/24
[52] U.S. Cl. ..................................... 528/500; 55/206; 260/29.6 PT; 526/344
[58] Field of Search ................. 528/500; 260/29.6 PT

[56] References Cited

U.S. PATENT DOCUMENTS

| | | | |
|---|---|---|---|
| 3,259,555 | 7/1966 | Lankton | 528/501 |
| 3,926,927 | 12/1975 | Stookey | 159/48 R |
| 3,954,910 | 5/1976 | Kropp | 260/879 |

Primary Examiner—C. A. Henderson

Attorney, Agent, or Firm—Connolly and Hutz

[57] ABSTRACT

An aqueous polymer dispersion containing approximately 1 to 60 weight % of solid polymer particles with an average size of 20 to 500 microns and 5000 to 15,000 ppm of monomer(s), is freed from monomeric material. More specifically, the aqueous dispersion is preheated to 60° to 90° C. and introduced continuously into an upper portion of a column accommodating a plurality of apertured trays disposed one above another of which each has at least one eccentric aqueous dispersion descent shaft. The aqueous dispersion is introduced at a rate of a 5 to 35 m$^3$ per m$^2$ of tray area per hour and contacted countercurrently with steam at 80° to 150° C., under 0.5 to 5 bars, and in a proportion of 30 to 100 kg of steam per m$^3$ of dispersion, for a mean period of 1 to 30 minutes; the pressure drop for steam ascending through one tray in the column being lower than that which would occur upon the undesirable passage of steam through one of the said shafts. At the column base, aqueous dispersion freed from monomeric material is removed and a vapor mixture emerging at an upper level of the column, is condensed, and monomeric material and an aqueous phase are recovered therefrom.

11 Claims, No Drawings

CONTINUOUS REMOVAL OF MONOMERS FROM AN AQUEOUS DISPERSION OF A POLYMER

This invention relates to a process for continuously freeing an aqueous dispersion of a polymer from a monomer present therein, the polymer being a homopolymer, graft polymer or copolymer, and having an extremely small concentration of residual monomer after purification.

It has long been known that aqueous polymer dispersions can be freed from volatile constituents by passing an inert gas or steam through the dispersion, the temperature of the latter being approximately 60° to 70° C.; thus the dispersion can be subjected to steam distillation. This has been described in German Published Specification ("Auslegeschrift") No. 1,248,943, and in "Kunststoffe" (1959), volume 49, No. 10, page 499, and also in "Chemical Engineering", Mar. 1972, page 96.

In those cases in which aqueous polyvinyl chloride suspensions are worked up under the conditions just described, the polymer can be subsequently dried by means of air, whereby it is freed from a further proportion of vinyl chloride, e.g. about 2 weight % (based on the quantity of vinyl chloride subjected to polymerization), which could be allowed to escape into the atmosphere. In this case, the issuing gas would contain vinyl chloride in a proportion well beyond an acceptable emission limit, and more particularly beyond 150 mg of vinyl chloride per cubic meter of issuing gas. In addition to this, excessive proportions of vinyl chloride go into the waste water.

Despite this working up, the final dry polyvinyl chloride still contains, in typical cases, several hundred ppm of monomeric vinyl chloride, which is absorbed in the polymer and cannot be removed therefrom by a purifying procedure as described above.

One of the uses of polyvinyl chloride sheets is in packing food, however, and this may entail a hazard inasmuch as residual monomer(s) present in the polymer sheet may migrate into the food. It is therefore obligatory for the monomer-containing polymers to be subjected to an additional purifying treatment.

A process wherein dry polyvinyl chloride made in the usual manner is freed from residual vinyl chloride, which is enclosed or occluded in the polymer particles, has been described in German Published Specification ("Offenlegungsschrift") No. 2,331,895. This process, which enables polyvinyl chloride to be freed from monomeric vinyl chloride and further comonomer(s), if any, comprises: heating the polymer to a temperature ranging from its solidification temperature to 180° C. by directly condensing steam thereonto; maintaining the polymer at the temperature thus attained for the period necessary to free it from the bulk of monomer or monomers therein; and cooling the polymer down to a temperature lower than its solidification temperature by evaporating the water formed when the steam was condensed on to the polymer. A preferred version of this process comprises heating the polymer to 80° to 130° C. for about 5 to 120 minutes, more particularly for 10 to 60 minutes. Typical of this known process is the fact that the degasification is effected at the condensation temperature of the water, as described in the examples of the above-mentioned specification No. 2,331,895.

A disadvantage encountered with this known process resides in the fact that the polymer purified is still liable to contain a relatively high proportion of monomer(s). As shown in Example 1 of the above-mentioned specification No. 2,331,895, the purified polymer contains 3 g of residual monomer(s) per kg of polymer, i.e. 3000 ppm. This known process is effected at elevated temperatures, and in certain cases under elevated pressures, according to the condensation temperature of the water in the particular procedure adopted, and this naturally means high and commercially unattractive consumption of steam.

A further process for freeing a polymer suspension from unreacted monomer(s) has been described in U.S. Pat. No. 3,454,542, wherein the suspension descends cascade-wise through a separating column provided with deflecting plates, while gas is caused to flow upwardly through the column, countercurrently to the suspension. In this process, the separating column is indeed not liable to be seriously fouled or obstructed, but the contact between the suspension and gas is not as intimate as would be desirable, and this has adverse effects on the removal of monomer from the suspension.

A still further process for removing volatile constituents from an aqueous suspension containing up to 50 weight % of solid material has been described in German Patent Specification ("Offenlegungsschrift") No. 2,552,683. This process comprises:
(a) flowing a suspension downwards through a degasification column having a plurality of surfaces disposed sequentially therein, each of these surfaces being provided with perforations through which the suspension falls from the respective surface to the next surface below it; and
(b) flowing an inert gas upwardly through the perforations countercurrently to the suspension, which is degassed and at the same time kept in motion to such an extent as to prevent any significant deposition of its solid constituents, the stream of inert gas being pulsed so that the descent of the suspension through the perforations is periodically interrupted.

Depending on the particular type of polymer suspension which is to be processed, it may be impossible, in the process just described, to prevent the perforations in the above-mentioned surfaces in the degasification column from becoming clogged; this applies more specifically in those cases in which the perforations are of inadequate dimensions for the suspension being processed. If the perforations are overdimensioned, on the other hand, there will be an increased consumption of the inert gas, e.g., steam, which naturally will adversely affect the economy of the process.

It is an object of the present invention to provide a process which, in marked contrast with the prior methods described above, will permit an aqueous polymer dispersion to be freed from monomeric constituents with the resultant formation of a purified product containing only a few ppm of residual monomer(s), the purified product having this low concentration of residual monomer(s) being obtained much more rapidly than in the prior processes of which we are aware.

In addition, it is an object of the present invention to provide a process wherein there is little danger of production stoppages such as are liable to occur in prior-art degasification columns which become clogged by the deposition of polymer particles.

According to the present invention, we provide a process for removing monomeric material from an aqueous polymer dispersion containing approximately 1 to 60 weight % of solid polymer particles with an average size of approximately 20 to 500 microns and approximately 5000 to 15,000 ppm of monomer(s), which comprises: preheating the aqueous dispersion to approximately 60° to 90° C. and introducing it continuously into an upper portion of a column accommodating a plurality of apertured trays disposed one above another of which each has at least one eccentric aqueous dispersion descent shaft; the aqueous dispersion being introduced at a rate of approximately 5 to 35 m$^3$ per m$^2$ of tray area per hour and being contacted countercurrently with steam at approximately 80° to 150° C., under a pressure of approximately 0.5 to 5 bars, and in a proportion of 30 to 100 kg of steam per m$^3$ of dispersion, for a mean period of approximately 1 to 30 minutes; the pressure drop for steam ascending through one tray in the column being lower than that which would occur upon the undesirable passage of steam through one of the said shafts; removing, at the column base, aqueous dispersion freed from monomeric material; and condensing a vapour mixture emerging at an upper level of the column, and recovering monomeric material and an aqueous phase therefrom.

Preferably the aqueous polymer dispersion contains 20 to 40 weight % of solid polymer particles and 8000 to 10,000 ppm of monomer(s), the solid polymer particles preferably having an average size of 50 to 150 microns. The polymers contemplated herein include vinyl chloride polymers, and more specifically homopolymers of vinyl chloride, and copolymers of vinyl chloride, e.g. copolymers of vinyl chloride and vinyl acetate.

Preferably also the aqueous dispersion is introduced into the upper portion of the column in a proportion of 10 to 25 m$^3$ per m$^2$ of tray area per hour, and preferably each apertured tray has 1 to 4 of the said shafts. The contact of the dispersion with the steam at approximately 80° to 150° C. which ascends through the column, and which is preferably at 90° to 120° C. under a pressure of 0.7 to 2 bars, usually gives a temperature of 85° to 115° C. near the head of the column.

The process of the present invention generally permits the dispersion, which is a mixture of solid and liquid constituents, to be vigorously agitated by means of the steam so that it remains a homogeneous mixture. To this end, however, we prefer to employ in the column a proportion of steam of 40 to 80 kg of steam per m$^3$ of dispersion. At those places in the interior of the column where the dispersion is not likely to come into contact with the steam, e.g. in the said shafts and in the regions of flow between the trays and their respective feeding shafts, it is advisable that the aqueous dispersion should have a velocity of 0.02 to 0.2 m/second, preferably 0.05 to 0.1 m/second. The aqueous dispersion can be particularly effectively freed of monomer(s) in a process in accordance with this invention if, as is preferred, it is allowed to remain in the column for a mean period of 3 to 10 minutes.

A still further preferred feature of the present invention provides for the aqueous phase which is recovered, on subjecting the said vapour mixture to condensation, to be united with the polymer dispersion which is being introduced into the upper portion of the column to be freed from the monomer(s).

With regard to the blowing out of monomeric constituents from dispersions of a vinyl chloride homopolymer or graft polymer, it is appropriate to mention that these are dispersions which can be obtained by (e.g.) a process as described by H. Kaiser in the book entitled "Polyvinylchlorid und Vinylchloridmischpolymerisate" ("Polyvinyl chloride and vinyl chloride copolymers"), Springer Verlag, Berlin/Heidelberg/New York, 1965, pages 12-59.

The process of the present invention is preferably carried out with the use of a degasification column as described in German Patent Specification ("Offenlegungsschrift") No. 2,550,023, (and in the corresponding U.S. Pat. No. 4,062,662) which is of a structure permitting the pressure drop for steam ascending through one tray in the column to be kept lower than the pressure drop which occurs upon the passage of steam through one of the shafts referred to herein. This is necessary for the formation of a uniform agitated layer comprising the relevant three-phase mixture on the individual trays in the column, which enables the individual components of the mixture to be intimately contacted, and which enables monomer removal to be effected under optimum conditions. In addition, in the column described in the above-mentioned specification No. 2,550,023, it is easy to arrange for the aqueous dispersion to spend a period as contemplated herein on the individual trays, as these latter are provided with descent shafts having weir heights which are greater than is usual.

The process of the present invention permits an aqueous dispersion to be very effectively freed from residual monomer(s), e.g. to give a dispersion containing less than 10 ppm of residual monomer(s). In addition, as a result of the agitation which is produced on the present trays, and as a result of the easy descent of the dispersion from these trays, phenomena such as sedimentation and deposition of polymer particles in the column can be avoided, and production stoppages are not liable to be encountered during continuous operation. The fact that the present process can be carried out successfully in a column provided with trays having weir heights which are greater than is usual is clearly an unexpected result, inasmuch as polymer particles would have been expected to sediment, and in time to clog the apertures in the trays, under the operational conditions employed.

The following Examples illustrate the invention. Examples 1 to 3 used a column as described in the above-mentioned specification No. 2,550,023; more specifically, the column used had a plurality of apertured trays disposed one above another, and at a predetermined vertical separation from one another, in a column housing, wherein a gap as small as possible, but generally uniform in width around the periphery of the tray, was left between each tray and the column housing; the apertures in the trays had a diameter of less than 5 mm; each tray was penetrated by at least one eccentric descent shaft; at least one eccentric feeding shaft was arranged to terminate above each tray; and an impermeable area on the respective tray, at least as large as the cross-section of the feeding shaft, was provided below each feeding shaft.

In Examples 1, 2 and 3, the column used had the following structural features:

| | | |
|---|---|---|
| 1) | Diameter of column: | 400 mm |
| 2) | Number of trays | 14 |
| 3) | Separation of trays from one another | 300 mm |
| 4) | Diameter of apertures in trays | 2 mm |
| 5) | Free cross-section of trays | 5.7 % |
| 6) | Number of descent shafts | 1 |
| 7) | Diameter of descent shafts | 88.9 mm |
| 8) | Weir height | 120 mm |

-continued

| | | |
|---|---|---|
| 9) | Width of gap between tray and column housing | 1 mm |
| 10) | Area of impermeable surface on tray below feeding shaft | 6000 mm² |

EXAMPLE 1: (K-value 71)

An aqueous dispersion of polyvinyl chloride particles with an average size of 100 microns, which contained 25 weight % of solid polymer particles and also 3000 ppm of monomeric vinyl chloride, referred to the solids content, was freed from monomer. To this end, 2.5 m³/h of the dispersion preheated to 80° C. was supplied to the uppermost tray in the column described above. At the same time, 200 kg/h of steam at 160° C. was introduced into the column, below the lowermost tray therein, under a pressure of 6 bars. In the interior of the column, the steam underwent a pressure drop of 160 millibars; aqueous dispersion was in the column for a period of about 3 minutes. The temperature at the head of the column was 104° C. under an overpressure of 2 bars. The aqueous polymer dispersion freed from monomer which was taken from the base of the column at 106° C. had a residual monomer content of only 10 ppm of vinyl chloride, referred to the solids content. The column was operated over a period of more than 1000 hours, but polymer particles could not be found to have been deposited. Vaporous matter emerging at the head of the column was condensed.

EXAMPLE 2: (K-value 62)

The procedure was as in Example 1, but the feed dispersion was preheated to 65° C., and contained 3300 ppm of monomer. It was treated with 310 kg/h of steam at 160° C. and 6 bars. The temperature was 110° C. in the column base and 108° C. at the column head, and the aqueous dispersion was in the column for 3 minutes. The dispersion freed from monomer which was taken from the base of the column contained a mere 3 ppm of residual monomer, referred to the solids content.

EXAMPLE 3: (K-value 71)

The procedure was as in Example 1, but the feed dispersion was preheated to 60° C., and contained 7400 ppm of monomer. It was treated with 340 kg/h of steam at 160° C. and 6 bars. The temperature was 108° C. in the column base and 106° C. at the column head, and the aqueous dispersion was in the column for 3 minutes. The dispersion freed from monomer which was taken from the column base contained a mere 1 ppm of residual monomer, referred to the solids content.

EXAMPLE 4: (K-value 68)

The column used was as described in the above-mentioned Specification No. 2,550,023, and had the following structural features:

| | | |
|---|---|---|
| 1) | Diameter of column | 1200 mm |
| 2) | Number of trays | 17 |
| 3) | Separation of trays from each other | 300 mm |
| 4) | Diameter of apertures in trays | 2 mm |
| 5) | Free cross-section of trays | 5.7% |
| 6) | Number of descent shafts | 3 |
| 7) | Diameter of descent shafts | 159 mm |
| 8) | Weir height | 120 mm |
| 9) | Width of gap between trays and column housing | 1–2 mm |
| 10) | Area of impermeable surface on tray below feeding shaft | 60000 mm² |

An aqueous dispersion of polyvinyl chloride particles with an average size of 100 microns, which contained 25 weight % of solid polymer particles and also 5000 ppm of monomeric vinyl chloride, based on the solids content, was free from monomer. To this end, 25 m³/h of the dispersion preheated to 80° C. was supplied to the uppermost tray in the column described above. At the same time, 1200 kg/h of moist steam was introduced into the column, below the first tray therein. In the interior of the column, the steam underwent a pressure drop of 180 millibars; the aqueous dispersion was in the column for about 4 minutes. The temperature at the head of the column was 97° C. under an overpressure of 4 millibars. The aqueous polymer dispersion freed from monomer which was taken from the base of the column at 104° C. contained less than 10 ppm of residual monomeric vinyl chloride, referred to the solids content. Vaporous matter emerging at the head of the column was passed into a condenser of bundled tube construction. The resulting aqueous phase was recycled to remove solid particles from the condenser surfaces. The temperature was 97° C. upstream and 65° C. downstream of the condenser.

EXAMPLE 5:

The procedure was as in Example 4, but the polyvinyl chloride used was easier to free from monomer; it comprised particles with an average size of 150 microns, had a K-value of 70, and contained 7000 ppm of vinyl chloride. 950 kg/h of moist steam was introduced into the column, below the first tray therein. The aqueous polymer dispersion which was taken from the base of the column at 95° C. contained less than 1 ppm of residual monomeric vinyl chloride, referred to the solids content. The temperature was 90° C. upstream and 58° C. downstream of the condenser.

EXAMPLE 6:

An aqueous dispersion of temperature-sensitive polyvinyl chloride was freed of monomer. It comprised particles with an average size of 120 microns, contained 23 weight % of solid polymer particles, had a K-value of 68, and also contained 4200 ppm of monomeric vinyl chloride, referred to the solids content. The dispersion was freed of monomer in a column having the following structural features:

| | | |
|---|---|---|
| 1) | Diameter of column | 100 mm |
| 2) | Number of trays | 5 |
| 3) | Separation of trays from each other | 300 mm |
| 4) | Diameter of apertures in trays | 2 mm |
| 5) | Free cross-section of trays | 5.6 % |
| 6) | Number of descent shafts | 1 |
| 7) | Diameter of descent shafts | 25 mm |
| 8) | Weir height | 180 mm |
| 9) | Width of gap between tray and column housing | 0 mm |
| 10) | Area of impermeable surface on tray below feeding shaft | 707 mm² |

The five trays were clamped to individual segments of the column housing, their apertured area extending to the column housing, but no gap being left between the trays and the column housing.

0.016 m³/h of the above dispersion preheated to 50° C. was supplied to the uppermost tray in the column described above. At the same time, 2.2 kg/h of steam at 143° C. was introduced into the column, below the first tray therein, under a pressure of 4 bars. In the interior of the column, the steam underwent a pressure drop of 62 millibars, and the aqueous dispersion was in the column for about 15 minutes. The temperature was 98° C. at the column head. The aqueous polymer dispersion freed from monomer was taken from the base of the column at 101° C., and contained less than 1 ppm of residual monomeric vinyl chloride, referred to the solids content.

We claim:

1. A process for removing continuously vinyl chloride from an aqueous dispersion of polyvinyl chloride with a K-value of 62-71 said dispersion containing about 1 to 60 weight % of solid polyvinyl chloride particles with an average size of about 20 to 500 microns and about 5000 to 15,000 ppm of vinyl chloride which comprises (A) preheating the aqueous dispersion to about 60 to 90° C. and introducing it continuously into the upper portion of a degassing column comprising a vertically elongated tubular shell provided with a plurality of substantially horizontally disposed apertured plates; said plates being vertically spaced within and attached to the inner surface of said shell; each of said plates being penetrated by at least one excentrically arranged conduit comprising a draining shaft in the upper portion thereof and a feed shaft in the lower portion below the penetrated plate; each plate is supported by a plurality of wedge mountings and is wedged therewith, said wedge mountings being fastened around the inner surface of said shell; a mall gap uniform in width over the periphery is left between each plate and said shell; and a surface portion of each apertured plate underneath each conduit is impermeable; the aqueous dispersion being introduced at a rate of approximately 5 to 35 m³ per m² of plate area per hour;

(B) said aqueous dispersion being contacted countercurrently with steam at approximately 80° to 150° C., under a pressure of about 0.5 to 5 bars, and in a proportion of 30 to 100 kg of steam per m³ of dispersion, for a mean period of about 1 to 30 minutes; removing at the column base aqueous dispersion containing 1 to 10 ppm vinyl chloride; and condensing a vapour mixture emerging at an upper level of the column, and recovering vinyl chloride and an aqueous phase therefrom.

2. The process as claimed in claim 1, wherein the aqueous polymer dispersion contains 20 to 40 weight % of solid polymer particles and 8000 to 10,000 ppm of monomer(s).

3. The process as claimed in claim 1, wherein the said polymer particles have an average size of 50 to 150 microns.

4. The process as claimed in claim 1, wherein each apertured tray accommodated in the column has 1 to 4 of the said eccentric shafts.

5. The process as claimed in claim 1, wherein the aqueous dispersion is introduced into the upper portion of the column in a proportion of 10 to 25 m³ per m² of tray area per hour.

6. The process as claimed in claim 1, wherein the aqueous dispersion is treated with steam at 90° to 120° C. under a pressure of 0.7 to 2 bars.

7. The process as claimed in claim 1, wherein the proportion of steam employed in the column is 40 to 80 kg of steam per m³ of dispersion.

8. The process as claimed in claim 1, wherein the aqueous dispersion is allowed to remain in the column for a mean period of 3 to 10 minutes.

9. The process as claimed in claim 1, wherein the aqueous dispersion has a velocity of 0.02 to 0.2 m/sec. in the said shafts, and in its regions of flow between the trays and their respective feeding shafts.

10. The process as claimed in claim 1, wherein a temperature of 85° to 115° C. is established at the head of the column.

11. The process as claimed in claim 1, wherein the aqueous phase which is recovered on subjecting the said vapour mixture to condensation is united with the polymer dispersion which is being introduced into the upper portion of the column.

* * * * *